June 23, 1931.   R. LEJAY   1,811,323
STATIC SUCTION APPARATUS
Filed March 18, 1929
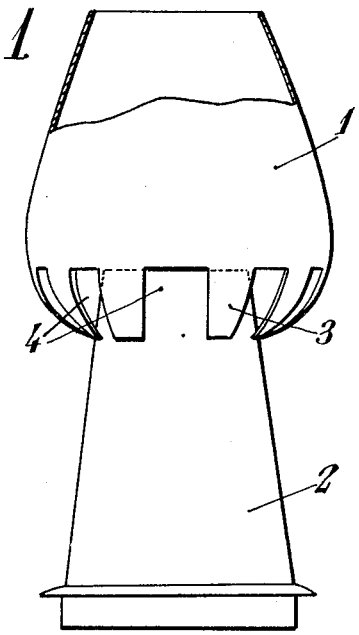
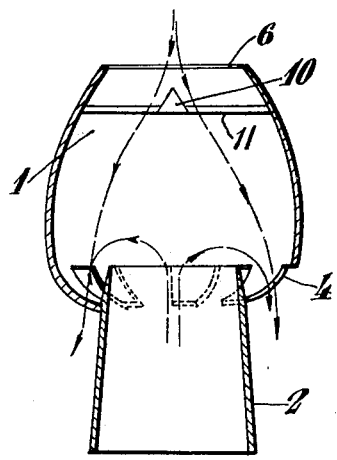
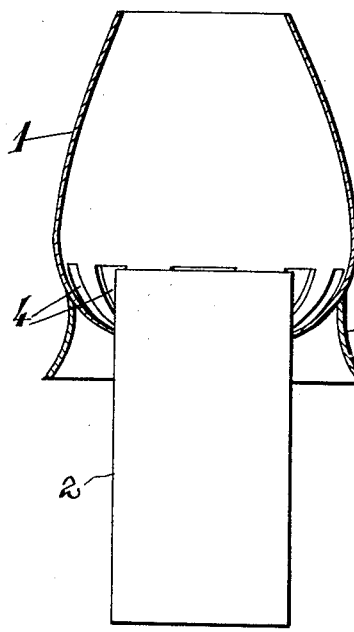
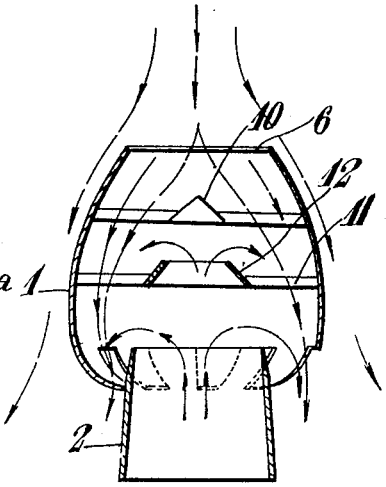
R. Lejay
INVENTOR
By: Marks & Clerk
Attys.

Patented June 23, 1931

1,811,323

UNITED STATES PATENT OFFICE

RAYMOND LEJAY, OF VINCENNES, FRANCE

STATIC SUCTION APPARATUS

Application filed March 18, 1929, Serial No. 348,102, and in France March 30, 1928.

The present invention relates to suction devices.

Numerous types of suction devices have already been provided, particularly for improving the draught of chimneys or for the aeration of premises, these devices entering in action when they are struck by atmospheric air currents. These devices or apparatus are particularly efficient when they are struck by atmospheric air currents the general direction of which is perpendicular to the displacement of the sucked fluid. This is not the case when the atmospheric currents are distinctly oblique relatively to the direction of displacement of the sucked air, that is to say, in practice, oblique relatively to the general axis of the draught conduit for the sucked fluid. In the case of distinctly oblique and downwardly moving currents, re-entrances of air usually take place in the draught conduit for the sucked fluid.

The invention is adapted to remedy, by extremely simple means, the above mentioned inconveniences and, for that purpose has for an object to provide suction apparatus characterized by the combination, with one or more draught conduits for the sucked fluid, of at least one enclosure the directrix of which is a polygonal line or a closed curve and the generating line a broken line or a curve the convexity of which is turned outwardly, this enclosure being open at least at its upper and lower parts.

In the accompanying drawings:—

Fig. 1 is a side elevation of the device, partly in section.

Fig. 2 is a sectional view of a modified form of the invention, the conduit being shown in elevation.

Fig. 3 is a sectional view of another modified form of the invention.

Fig. 4 is a similar view of still another modified form of the invention.

In the example illustrated in Fig. 1, the enclosure 1 has a curvature similar to a parabola and is substantially constituted by a spherical zone the parallel secant planes of which are located on either side of the center of the sphere, or the generating line can be an arc of circle the center of which is not on the axis of generation A—A.

Such an enclosure can be made of any suitable material: sheet-iron, cast metal, ceramics, cement, etc. It fits on a draught conduit 2 for the sucked fluid and is secured thereon by tongues 3 providing between them ports 4 giving access to the interior of the enclosure 1, said enclosure having an open upper end. The draught conduit 2 opens within the enclosure 1 in the form of a conical nozzle the external part of which is adapted to fit on draught conduits and to be secured on the said draught conduits (chimneys or aeration pipes already existing). The maximum curvature of the enclosure 1 is above the ports 4.

Figure 2 shows an aeration apparatus the enclosure 1 of which is provided, at its lower part, with a skirt 1ª having a rectilinear generating line or a curvature opposed to that of the generating line of the enclosure 1 proper. This arrangement allows to increase, in the case of currents of air horizontally directed, the depression in the neighborhood of the ports 4.

In the modified form shown in Fig. 3, the enclosure 1 is provided with a deflector 10 the shape of which can, substantially, be that of a conical member the point of which is directed upwardly and supported relatively to the enclosure 1 by means of narrow arms 11. This conical member can be of reduced dimensions and constitutes a negligible obstacle for the ascending currents coming from the draught conduit 2.

In case of an absolutely plunging wind, the small air streams are thrown back in the direction of the arrows, providing a central draught zone and the mixture formed of driving wind and sucked fluid is evacuated through the ports 4.

The effects of the deflector can, moreover, be easily increased, without creating any appreciable obstruction to the rising of the sucked fluid, in the case of oblique or horizontal currents. For that purpose, it is possible to have recourse to the modification shown in Fig. 4, and in which the deflector is divided in at least two parts, an upper part or point 10, and one or more lower rings 12 suitably supported relatively to the enclosure, as well as the point 10, by means of arms 11 as narrow as possible. The respective directions of the streams of the driving and sucked fluids, are indicated by the arrows in the case of an absolutely plunging driving current.

The application of the suction apparatus forming the subject-matter of the invention is, obviously, not limited to chimneys for the evacuation of smoke, or to conduits for the aeration of premises. The use of these suction apparatus is more generally suited to cases in which it is required to ensure the suction of a fluid by utilizing the natural or forced displacement of another fluid.

What I claim as my invention and desire to secure by Letters Patents is:

1. In a suction apparatus of the type described, an ovoid enclosure the generatrix of which has a curve increasing from its free edge to the fixed part on the suction conduit, deflectors disposed internally of the said enclosure for resisting the admission of a plunging wind in the suction conduit, tongues on the part with maximum curvature and forming openings between them, and means for fixing the free ends of the said tongues on the suction conduit.

2. In a suction device comprising an ovoid enclosure body, open at its lower and upper ends, disposed coaxially relative to the end of a suction conduit, tongues on the enclosure in the zone of the maximum curvature thereof, the generatrix of the enclosure having a curvature increasing from its upper end to the tongues, and means for securing the tongues to the conduit.

3. In a suction device comprising an ovoid enclosure, the generatrix of which has a curve increasing from its free end, a deflector disposed interiorly of the enclosure for resisting the admission of a plunging wind in a suction conduit, tongues on the enclosure in the zone of its maximum curvature and forming ports between them, means for fixing the free ends of the tongues on the suction conduit, at points below the upper edge thereof, the portion of the conduit extending above said points constituting a wall in front of said ports for preventing them from being struck directly by the wind.

In testimony whereof I have signed my name to this specification.

RAYMOND LEJAY.